April 22, 1930. F. H. OWENS 1,755,487
OPTICAL PRINTER
Filed Nov. 12, 1926
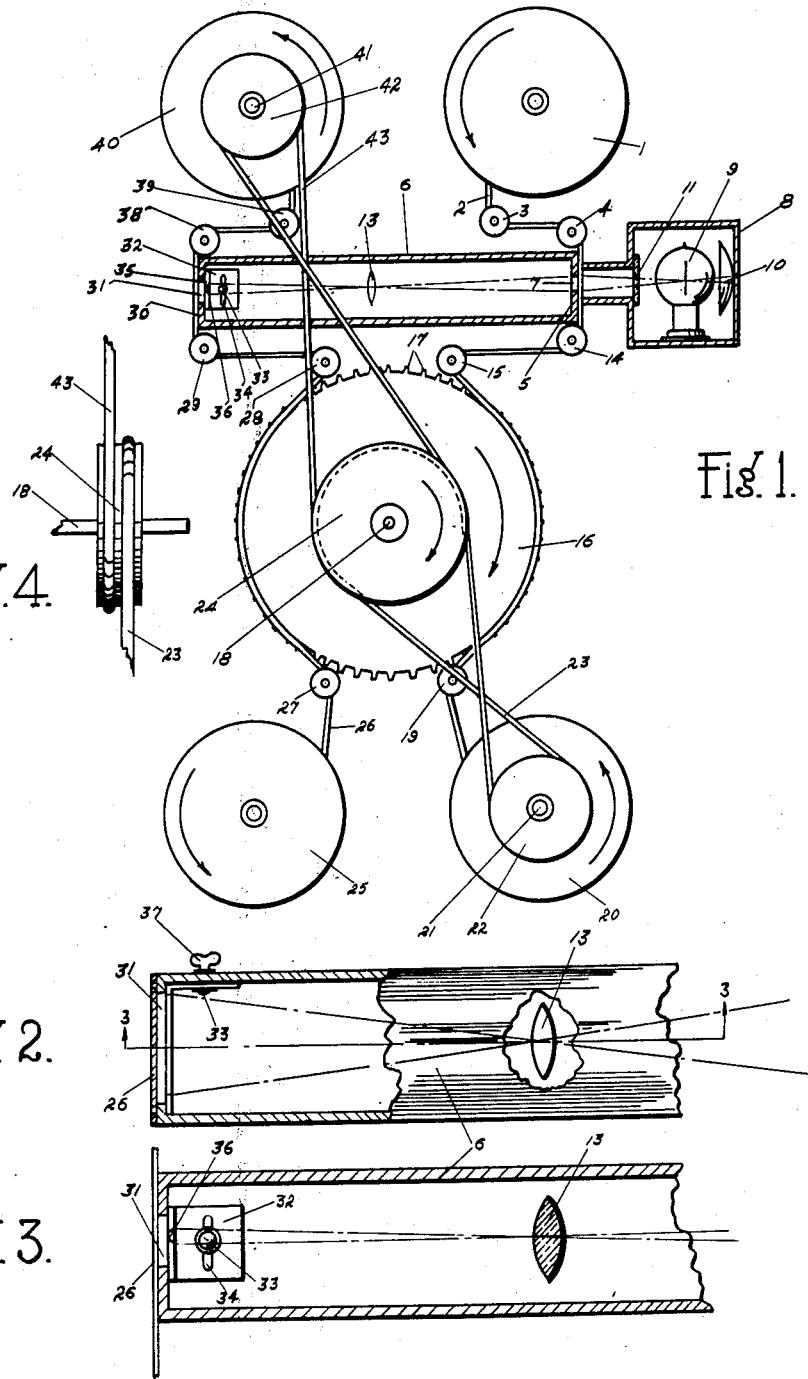
INVENTOR
FREEMAN H. OWENS.
BY Philip S. Hopkins
ATTORNEY Patented Apr. 22, 1930

1,755,487

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

OPTICAL PRINTER

Application filed November 12, 1926. Serial No. 147,981.

My invention relates generally to optical printers, and particularly to that type for printing images from a strip of negative film to a strip of positive film. The invention is applicable particularly to the printing of moving picture film, usually in long strips or lengths and having the images thereon in successive relation.

The primary object of my invention is to provide a driving mechanism for the film, which consists of a single sprocket over which both the films, the negative and positive, are moved and by which they are moved synchronously, thereby insuring accuracy and uniformity of speed as regards the movement of both films.

Another object is to provide a novel form of exposing device whereby the images on the negative film may be continuously printed on the positive film.

Still another object is the provision of a novel form of adjustable slit for adjusting the relative position of the image projected from the negative film with respect to the perforations of said positive film.

Other objects of advantage in details of construction and operation will be apparent as the description proceeds, reference being had to the accompanying drawing wherein like reference numerals indicate like parts.

Figure 1 is a diagrammatic side view of my improved optical printer, certain parts being in section for clearness of illustration.

Figure 2 is a detail plan view of the box or casing through which the printing exposure is made.

Figure 3 is a sectional detail taken on the line 3—3 of Figure 2.

Figure 4 is a detail edge view of the pulley driving mechanism for the film strips.

The reference numeral 1 indicates a reel or other suitable source of supply for a strip of negative film 2, which is drawn from the reel 1 over idle rollers 3 and 4, and downwardly in a vertical plane past the end 5 of a box or casing 6. The end 5 of the box 6 is provided with a slit 7, and adjacent this end of the box is provided a casing 8 within which are located a lamp 9 and reflector 10. The light rays from the lamp 9 pass through a diffusing glass or screen 11, and then through the negative film 2, and on through the slit 7 in the end of the box. The illuminated images on the film 2, are thus projected through the slit 7, through the lens 13, within the box, and on to the opposite end of the box to be described later.

After passing the end 5 of the box 6, the negative film turns over idle rollers 14 and 15, and then partially around one side of a sprocket 16 provided with the usual sprocket teeth 17 which engage within the ordinary perforations in the film whereby the film may be moved upon rotation of the sprocket. The sprocket 16 is secured upon the shaft 18 which may be continuously driven from any suitable source of power (not shown).

Leaving the sprocket 16, the negative film 2 passes over an idle roller 19, and then to a take up reel 20, mounted on a shaft 21 provided with the pulley 22 over which is looped an endless belt 23 also engaged around a double pulley 24, secured upon the shaft 18.

Adjacent the take up reel 20 for the negative film is a supply reel 25 from which is drawn a strip of positive film 26. This film passes over and around the idle roller 27, and then over a portion of one side of the sprocket 16, opposite the negative film. After leaving the sprocket 16, the positive film 26 passes over idle rollers 28 and 29 and then upwardly in a vertical plane, past the end 30 of the box 6 opposite the end 5 thereof. This end 30 of the box is also provided with a slit or opening 31 past which the positive film strips move.

Located within this end of the box 6 is a novel adjustable slit member comprising the wing 32 vertically adjustable on one side of the box 6 as by means of the pin and slot connection 33 and 34. The wing 32 is provided with an angular exposure frame member 35 provided with the slit 36 through which the illuminated and projected images from the negative film are passed on to the positive film as it moves past the end of the box. As clearly shown in Figure 2, the adjustable slit members 32 and 35, may be secured in adjusted position in the box 6 by means of the wing nut 37. It will be understood, of course, that the adjustable slit member may be positioned at either end of the box 6, adjacent either the positive or negative film.

After passing the end 30 of the box 6, the positive film moves over and under idle rollers 38 and 39 and is wound upon the take up reel 40 mounted on the shaft 41, which is provided with the pulley 42 over which is looped an endless belt 43 also passing over the double pulley 24 on the shaft 18.

From the foregoing, it will be clear that as the shaft 18, and consequently the spocket 16, rotates, the negative film 2 will be moved downwardly past the opening 7 in the end of the box 6, and simultaneously therewith, the positive film 26 will be moved upwardly past the opposite end 30 of the box, and past the adjustable slit 36 therein. Of course, suitable friction or other take up mechanism is employed in connection with the take up reels of the film strips. Such mechanism has been omitted for clearness' sake as it forms no part of this invention. The images on the negative film 2 will therefore be continuously printed at a constant speed upon the positive film 26. The single sprocket over which both strips of film are engaged, and by means of which they are moved, insures the uniform speed of movement of both strips.

In this specification where I have referred to "negative" film, I have reference to image bearing film which has been exposed and developed, and by "positive" film, I refer to sensitized, unexposed film.

Of course many details are omitted which are incident to a printer of this character, such details being common and well known in the art. Their omission has been intentional for the purpose of clearness of illustration.

Many changes may be made in detail of construction and arrangement of parts without departing from the spirit and scope of my invention. I do not limit myself therefore to the exact structure shown and described, other than by the appended claims.

I claim:—

1. An optical printer comprising a single means for moving strips of negative and positive film continuously in fixed spaced relation to each other at one point, such movement being in opposite directions and at the same speed, means for projecting the images from said negative film to said positive film comprising a casing over the ends of which said film strips move, openings in the ends of said casing, a light source adjacent the end over which said negative film moves, for illuminating the images of said film as it moves past the opening in said end, a lens in said casing through which said images pass, and an elongated slit in said casing adjacent the end over which the positive film passes, said slit comprising an angle bracket adjustably secured to one side of said casing and having an arm provided with a slit extending over the opening in the ends of the casing, whereby said slit may be adjusted with respect to said positive film moving thereover.

2. An optical printer comprising a shaft, a single sprocket thereon engaging strips of negative and positve films on opposite sides thereof whereby they are moved at the same speed in opposite directions, means for positioning and maintaining said film strips in spaced and parallel relation at a point free of said sprocket, and projection means for projecting the images from said negative to said positive film at such position.

3. An optical printer comprising a single means for moving strips of negative and positive film continuously in fixed spaced relation to each other at one point, such movement being in opposite directions and at the same speed, means for projecting the images from said negative film to said positive film comprising a casing over the ends of which said film strips move, openings in the ends of said casing, a light source adjacent the end over which said negative film moves, for illuminating the images of said film as it moves past the opening in said end, a lens in said casing through which said images pass, and an elongated slit in said casing adjacent the end over which the positive film passes, said slit comprising an angle bracket adjustably secured to one side of said casing and having an arm provided with a slit extending over the opening in the ends of the casing, whereby said slit may be adjusted with respect to said positive film moving thereover, take up and supply reels for said film strips, and driving means between said shaft and said reels.

FREEMAN H. OWENS.